United States Patent [19]

Bradshaw

[11] Patent Number: 4,525,424
[45] Date of Patent: Jun. 25, 1985

[54] FLEXIBLE MAGNETIC RECORDING MEDIA HAVING A POLYESTER-POLYURETHANE BINDER AND CHROMIUM DIOXIDE PIGMENT

[75] Inventor: Richard L. Bradshaw, Tucson, Ariz.

[73] Assignee: International Business Machines Corporation, Armonk, N.Y.

[21] Appl. No.: 567,291

[22] Filed: Dec. 30, 1983

[51] Int. Cl.³ .................... G11B 5/70; B32B 27/40
[52] U.S. Cl. ................ 428/425.9; 252/62.54; 360/134; 360/135; 360/136; 428/329; 428/694; 428/900; 427/128
[58] Field of Search ............ 428/695, 694, 900, 425.9, 428/328, 329; 427/128, 131, 132; 360/134–136; 252/62.54

[56] References Cited

U.S. PATENT DOCUMENTS

| | | | |
|---|---|---|---|
| 3,929,659 | 12/1975 | Graham | 252/62.54 |
| 4,284,750 | 8/1981 | Amirsakis | 528/79 |
| 4,286,022 | 8/1981 | Vermillion | 428/425.9 |
| 4,303,738 | 12/1981 | Gini et al. | 428/423.1 |
| 4,420,601 | 12/1983 | Kuroda | 427/128 |
| 4,477,531 | 10/1984 | Kohler | 428/694 |

FOREIGN PATENT DOCUMENTS 2039930A 8/1980 United Kingdom ............ 428/425.9

Primary Examiner—Ellis P. Robinson
Attorney, Agent, or Firm—Francis A. Sirr

[57] ABSTRACT

Flexible magnetic recording media having chromium dioxide magnetic particles dispersed in a polyester-polyurethane binder which is a reaction product of (A) a hydroxyl-terminated polyester which itself is a reaction product of a hydrolytically stable difunction alcohol (preferably 1,4-cyclohexanedimethanol), (B) a chain extender (preferably 1,4-butanediol), and (C) an aromatic diisocyanate [preferably 4,4'-methylenebis (1,4-phenylene) diisocyanate (MDI)]. The proportions of (A), (B) and (C) are selected to produce a polyester polyurethane having a hard segment content in the range of 37 to 40 percent by weight, of a molecular weight above 60,000, with the soft segment molecular weight ($M_n$) being in the range of about 500 to 1500.

10 Claims, 11 Drawing Figures

FIG. 7  GEL PERMEATION CHROMATOGRAPHIC SEPARATION OF $CrO_2$-POLYESTER POLYURETHANE (pBDA) TAPE

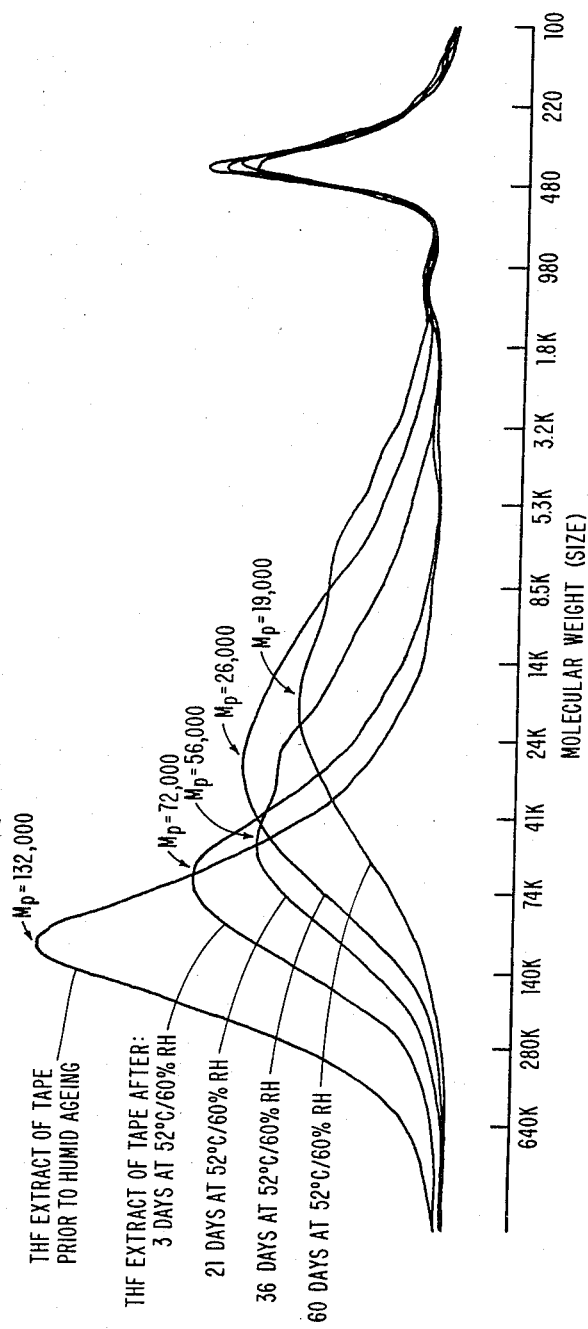

FLEXIBLE MAGNETIC RECORDING MEDIA HAVING A POLYESTER-POLYURETHANE BINDER AND CHROMIUM DIOXIDE PIGMENT

DESCRIPTION

1. Field of the Invention

This invention relates to the field of flexible magnetic recording media, such as tape, and to media having ferromagnetic chromium dioxide pigment in a polyester-polyurethane binder.

2. Background of the Invention

Flexible magnetic recording media generally comprises magnetic pigment or particles, polymeric binder, lubricant, dispersant, and other minor additives. The majority of magnetic particles of practical importance are metal oxides. Interactions which exist between the magnetic particles and the binder can effect the frictional characteristics of the media, such as tape.

Particle-binder interactions that are desirable, from the standpoint of tape-media performance, are those interactions which maintain separation of the individual particles, reinforce the mechanical properties of the binder, and hold the particles to the tape's flexible substrate in a cohesive coating. Undesirable interactions between the binder and the magnetic particles can lead to deterioration of magnetic performance, or to deterioration of the coating's mechanical properties.

Interaction between the binder and the particles is aggravated significantly by the fact that the majority of magnetic coatings contain magnetic-oxide particles in excess of 70% of the coating by weight, and as much as 50% by volume. In order to achieve these high particle loadings, strong interactions between the particle and the polymeric binder are necessary.

Polyester-polyurethanes (a type of thermoplastic elastomer) are widely used as binders for flexible magnetic recording media. These binders are rubbery materials which can be melted and cooled reversibly, without major changes occurring in their chemical or physical properties. Their unique properties, which are a direct result of the block-copolymer nature of these materials, make them significantly different from other elastomers, such as natural or synthetic rubber.

These materials are composed of segments or blocks of chemically different units. A simplified representation of a polyester-polyurethane elastomer is presented in FIGS. 1 and 2. The polyester portion, or soft segment, is composed of a repeating series of ester-linked units, and is itself a short-chain-length polymer. The polyester segments are formed by the reaction of a difunctional carboxylic acid with a difunctional alcohol, such that the ester is terminated substantially with alcohol-end groups. This polyester portion typically has a molecular weight of from 500 to 4000, corresponding to chains composed of from four or five ester units, to as many as twenty. The effect of an increase in the length of the soft segment is generally an increase in the elasticity of the polyurethane. In general, it is the soft-segment portion of the polyester-polyurethane that determines the low temperature and the elastomeric properties of the binder.

The other component in the polyester-polyurethane is the polyurethane or hard-segment portion. This portion possesses a markedly different chemical and mechanical behavior from that exhibited by the polyester soft segments. In general, the hard segment is a hard, rigid polymer with a melting point near 200° C. The hard-segment is usually constructed from a difunctional aromatic diisocyanate, 4,4'-diphenylmethane diisocyanate (MDI), which is reacted with a difunctional alcohol, such as 1,4-butanediol. The hard segment usually has a very short chain length in the case of polyester-polyurethane elastomers used in solvent-based magnetic media coatings, because the hard segment is not particularly soluble in the common solvents (examples are THF and MIBK) used in the manufacture of magnetic-tape coatings. In addition, the size of the hard-segment blocks has been found to increase hardness, modulus, and flow temperature, at the expense of elasticity and toughness. For flexible magnetic recording tape, a balance of properties is sought so that the binder can be adapted to the requirements of magnetic recording.

BRIEF DESCRIPTION OF THE DRAWING

FIG. 11 shows that the use of the polyester-polyurethane of the present invention did in fact solve the problem shown by FIGS. 7 and 8.

THE INVENTION

Figure 1:
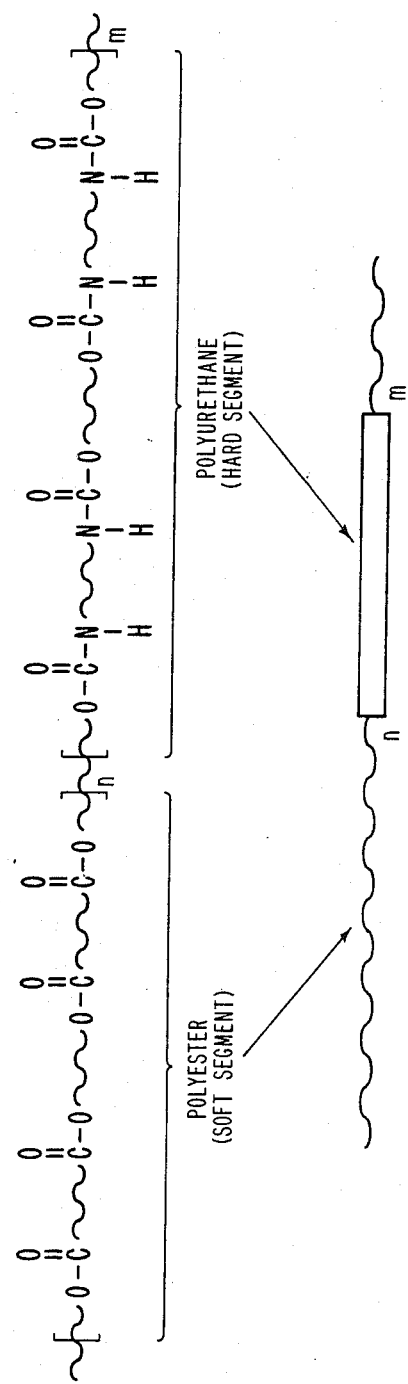
FIGS. 1 and 2 are simplified representations of a polyester-polyurethane and are helpful in explaining the present invention.

This invention is an improvement upon U.S. Pat. No. 4,284,750 (incorporated herein by reference), which describes the composition of a unique thermoplastic polyester-polyurethane, and describes its use in flexible magnetic recording media such as tape. Its examples relate only to media having iron oxide particles. A statement is made that any magnetic pigment, including magnetic chromium dioxide, is operable. However, there is no recognition that unexpected problems remain to be solved if chromium dioxide is used to make media in accordance with the teachings of this patent.

The present invention solves these heretofore unrecognized and unexpected problems.

More specifically, U.S. Pat. No. 4,284,750 (which describes the brand MORTHANE polyester-polyurethanes of Morton-Norwich Products, Inc.) relates to resins which are a reaction product of (A) cyclohexanedimethanol and an acid selected from the group adipic acid, azelaic acid and 1,12-dodecanedioic acid (including mixtures thereof); (B) a chain extender, of which 1,4-butanediol is preferred; and (C) a diisocyanate, of which MDI (methylenebis diphenyl diisocyanate, also known as 4,4'-diphenylmethane diisocyanate) is preferred.

It has been found that if one follows the teachings of this patent, when making chromium dioxide magnetic recording media, a substantial decay in the media's mechanical properties, such as the modulus (i.e., hardness, stiffness, load-bearing capacity) occurs within the temperature range 10°-50° C. If one tries to improve the media by thermal annealing, only slight improvement results.

It has been found that polyester-polyurethanes of the general type defined in this patent become satisfactory for use with chromium dioxide particles when the polyurethane possesses increased hard segment content (see FIG. 1), in the range 37 to 40% by weight, and preferably 40%, with the soft segment molecular weight being in the range of about 500 to 1500. As used herein, the term molecular weight means number molecular weight ($M_n$). More specifically, the hard segment is composed of MDI which is chain extended with butanediol to produce hard segment contents in the range 37 to 40% by weight, without loss of solubility and processability.

Too large a content of hard segment content (i.e., somewhat over 40% by weight) provides a binder which will not easily dissolve in desirable coating solvents, such as THF (tetrahydro furan) and MIBK (methyl isobutyl ketone). If too small a content of hard segment content is used (i.e., somewhat under 37% by weight) the coating is too soft, and mechanically deforms, such as when the tape media is wrapped under tension on a tape reel; or when the tape is stopped for a period of time, under tension, at the location of a magnetic recording head—both conditions producing what is known as drag (i.e., the tendency of the tape to thereafter resist movement).

The prior art recognizes the contribution which hard segment content can make to structural and mechanical properties of polyurethanes, as noted in the following publications.

R. J. Zdrahala, et al, *J. Elast. Plast.*, Vol. 12, 184 (1980)

S. L. Cooper and A. V. Tobolsky, *J. Appl. Poly. Sci.*, Vol. 10, 1837 (1966)

K. C. Frischland and S. L. Reegen, Ed., *Advances in Urethane Sci. Tech.*, Vol. 3, pp. 36–65 (1974)

T. E. Lipatova, et al, *Poly. Sci. USSR*, Vol. 20, 2305 (1979)

W. Nierzwicki and E. Szpilewicz, *J. Appl. Poly. Sci.*, Vol. 23, 2147 (1979)

R. J. Zdrahala, et al, *J. Elast. Plast.*, Vol. 12, 225 (1980)

C. S. Schollenberger, *Advances in Chemistry Series* 176, American Chemical Society (1979)

Figure 2:
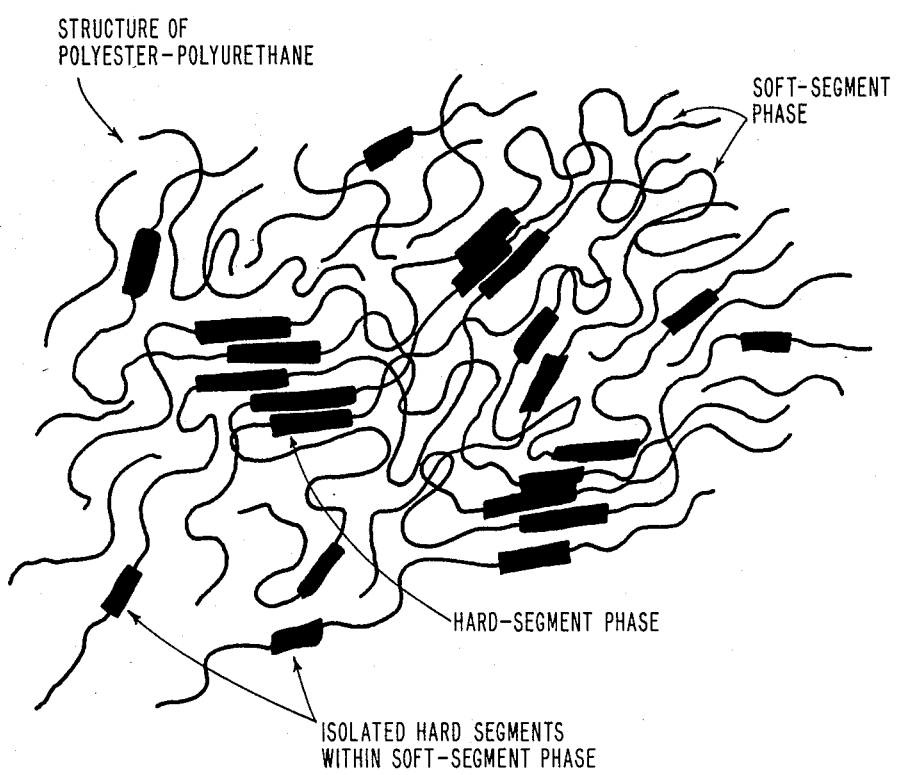

The latter of the above cited publications teaches that thermoplastic polyurethanes are made from three chemicals: (1) a diisocyanate, (2) a high-molecular-weight macroglycol, and (3) a low-molecular-weight chain extender glycol. The resulting elastomer consists of linear polymer primary chains which are segmented in composition; i.e., made up of alternating hard and soft segments which are joined end to end through strong, covalent chemical linkages (FIGS. 1 and 2).

The soft segments are linear reaction products of the diisocyanate component and the macroglycol component; while the hard segments are linear reaction products of the diisocyanate component and the glycol-chain-extender component.

This author recognizes that the polymer chemist makes soft segment, macroglycol, selection based upon factors such as desired mechanical properties, low-temperature flexibility and environment resistance; and makes selection of diisocyanate, and chain-extender-glycol components to produce high-melting hard segments based on considerations such as mechanical properties, upper service temperature, environmental resistance and solubility characteristics. Thus, the polymer chemist can regulate the elastomer's properties by varying the amounts of the diisocyanate and glycol-chain-extender components, relative to the macroglycol component.

However, no one to our knowledge has recognized the criticality of the weight percent of hard segment content of the particular polyurethane defined by U.S. Pat. No. 4,284,750, in order to solve the aforesaid unexpected problems which occur when chromium dioxide media is made from this polyurethane.

Moreover, we have found that characterization of this patent's polyester-polyurethane binder alone is not sufficient, since the synergistic effect of the chromium dioxide with the binder, in accordance with the present invention, yields new and unusual effects. Although differences in the modulus and hardness of a series of these resins, containing increasing amounts of hard segment, is predictable, the unusual magnitude of impact upon tape performance does not occur until a critical range of hard segment content, and pigment loading for $CrO_2$-pigmented media, is provided.

In accordance with the present invention, the critical range of $CrO_2$ loading is in the range 80 to 88% by weight, with 84% being the optimum.

Figure 3:
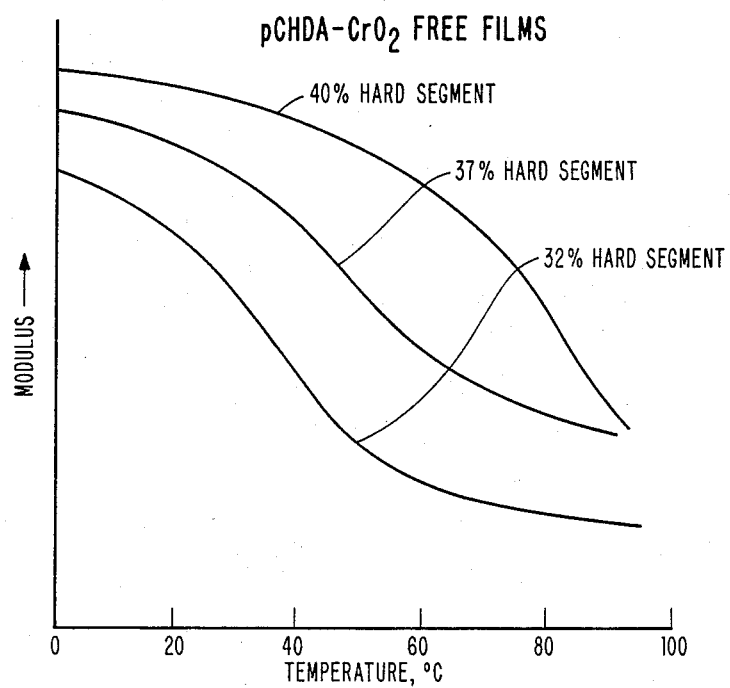
FIG. 3 shows the modulus change effected by the present invention, having the figure's stated hard segment content binders, the binders being filled with chromium dioxide particles.
Figure 4:
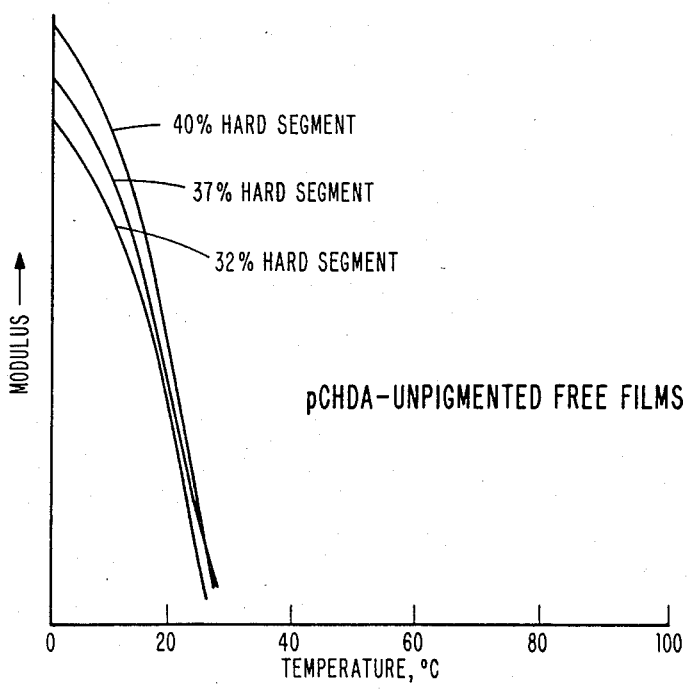
FIG. 4 shows the modulus change effected in the unfilled, or pigment-free, binders of FIG. 3.

An example of this behavior is demonstrated in FIGS. 3 and 4. The dynamic mechanical response of the unpigmented polyurethane binders, regardless of the amount of hard segment, was only slightly shifted (FIG. 4) with respect to the results obtained for films containing equivalent amounts of $CrO_2$ (FIG. 3). Although an increase in the modulus for U.S. Pat. No. 4,284,750's polyester-polyurethane is expected upon addition of a reinforcing filler (FIG. 3 shows $CrO_2$ filler in 32% to 40% hard segment content polyester-polyurethane binder), the large extent to which the modulus increased for a slight increase in hard segment content (FIG. 3) was neither anticipated nor satisfactorily explained by state of the art knowledge. Investigations relative the present invention indicate that the acid-base chemistry between $CrO_2$ and the polyurethane is dominated by interactions between the $CrO_2$ and the hard segment portions of the polyurethane.

Figure 5:
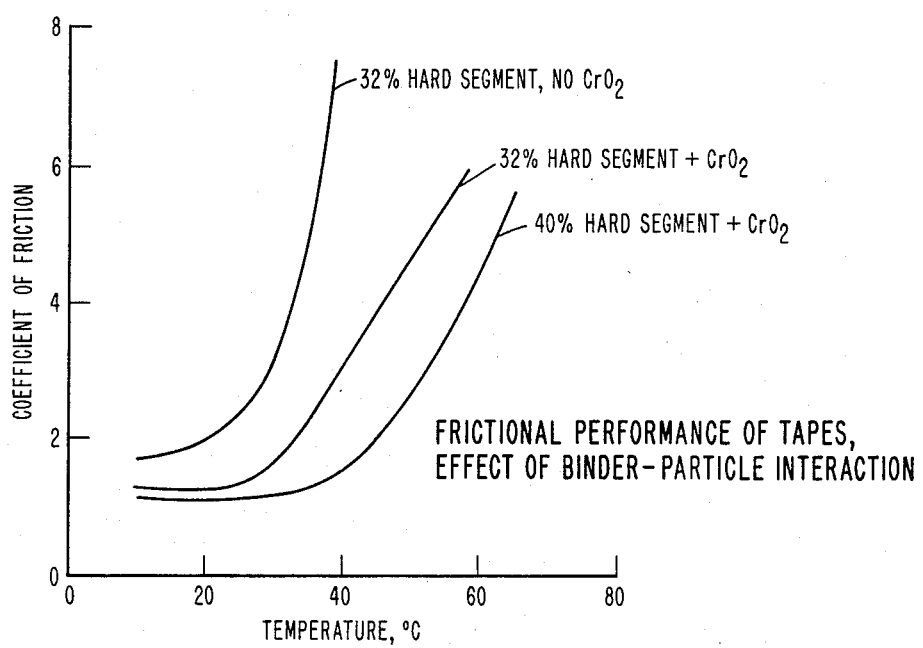
FIG. 5 compares the present invention's $CrO_2$ pigmented coatings to an unpigmented coating, of the figure's stated hard segment content.

The improved properties are not a result of the polyester-polyurethane per se, for it has been found that unpigmented films (i.e., films not having chromium dioxide particles) are not as free of friction, drag or stiction problems, as are the same films containing chromium dioxide (see FIG. 5).

Although particle-binder, acid-base, interaction is not new

J. W. Vanderhoff, et al, *Org. Coat. Appl. Poly. Sci., Preprints,* American Chemical Society, Vol. 46, pp. 12–16 (1982)

B. A. Bolto et al, *J. Appl. Poly. Sci.* Vol. 22, pp. 1977–1982 (1978)

N. Tsubokawa et al, *J. Poly. Sci., Poly. Chem. Ed.,* Vol. 20, pp. 1943–1946 (1982)

it appears that no study of the role of these interactions with respect to magnetic recording media performance has been reported.

Furthermore, it has been found that a definite correlation exists between the frictional performance of tape and the mechanical properties of the $CrO_2$-pigmented coating, as is shown by FIG. 5. Here the frictional properties of a coating without $CrO_2$ is demonstrated to have poor frictional stability under dynamic friction, giving rise to very high friction at ambient temperature conditions. The addition of $CrO_2$ to the polyurethane significantly improves the frictional behavior. The friction, however, was still unacceptable (32% hard segment plus $CrO_2$ curve) due to its instability at temperatures slightly above ambient. However, increasing hard segment, in accordance with the present invention, gave significantly improved friction performance.

U.S. Pat. No. 3,929,659 is cited for its showing of the use of an additive resin (i.e., a hard resin) to control the mechanical properties of a ferromagnetic-chromium-dioxide-containing magnetic recording media. While additives can be used, problems are encountered in finding an additive compatible with the urethane binder, and if a satisfactory additive is found, problems still remain in the mixing solution to be coated on the media's flexible substrate.

By modification of the urethane's hard segment content, the present invention eliminates problems associated with the use of urethane modifiers or additives.

Practice of the present invention requires the use of ferromagnetic chromium dioxide particles dispersed in a polyurethane binder of the aforesaid (A), (B) and (C) constituents discussed relative U.S. Pat. No. 4,284,750.

The chromium dioxide particles per se may be either stabilized or unstabilized from the effects of reductive degradation, as caused, for example, by the presence of water and certain easily oxidizable functional groups, such as hydroxyl or amine. Stabilized particles are, however, preferred.

The polyurethane binder must, in accordance with the present invention, comprise a thermoplastic polyurethane which is a reaction produce of (A) a hydroxyl-terminated polyester, which itself is a reaction product of a hydrolytically stable difunctional alcohol (preferably 1,4-cyclohexanedimethanol), and a dicarboxylic acid (selected from the group adipic, azelaic and 1,12-dodecanedioic acid, and preferable a mixture thereof), such that the polyester exhibits a hydroxyl number of about 50 to about 250;

(B) a diol chain extender (selected from the group 1,4-butanediol; 1,3-butanediol; 1,5-pentanediol; 1,6-hexanediol; and 2,5-hexanediol, and preferably mixtures of 1,4-butanediol and 1,6-hexanediol), in order that the hydroxyl number of the polyester and the chain extender together is about 130 to about 300; and (C) an aromatic diisocyanate [4,4'-diphenylmethane diisocyanate (MDI) is preferred].

In addition, the constituents (A), (B) and (C) must be used in a proportion to yield a polyurethane of hard segment content in the range of about 37 to 40 percent by weight.

Further, it is preferred that the molecular weight of the polyurethane be above 60,000; and that the molecular weight of the polyurethane's soft segment (FIG. 1) per se be in the range of about 500 to 1500. If the molecular weight of the soft segment is much lower than 500, the chromium dioxide media is too hard, and manufacturing processes, such as calendering, become difficult. If the molecular weight of the soft segment is much higher than 1500, the media is too soft, and topographic changes, leading to smoothing, tends to occur. This has been found to degrade the frictional performance of the tape.

It has been found that the chain extender (B) is important in that the flexibility of the hard segment (FIG. 1) is improved. Also, with the use of the aforesaid chain extenders, the media can be loaded with a high content of chromium dioxide pigment without becoming brittle.

Flexible magnetic recording media having chromium dioxide particles have been found to require this invention's unique polyurethane binder formulation in order to provide media which is both chemically and mechanically stable. Chemical instability can produce contamination of the magnetic head being used to transduce the media, resulting in stiction or drag between the head and the tape (i.e., friction which tends to prevent relative motion between two movable parts at their null position). Mechanical instability can produce topographic changes in the media's surface (i.e., the tape becomes supersmooth), with resulting undesirable changes in dynamic friction or drag between the moving tape and head. This topographic change can cause layers of tape media to adhere when wrapped under tension in a reel of tape for a period of time.

In addition, chromium dioxide media is sensitive to both hydrolysis and oxidative degradation.

It has been found that the use of polyester-polyurethanes, of this invention's critical formulation, produce chromium dioxide media which exhibits improved resistance to dynamic friction, drag and stiction problems. This is due to the use of a difunctional alcohol which exhibits hydrolytic stability—preferably 1,4-cyclohexanedimethanol—and to the resulting hard-segment-/soft-segment content in the critical range of about 37 to 40% by weight.

The improved properties are not a result of the polyester-polyurethane per se, for it has been found that the unpigmented films (i.e., films not having chromium dioxide particles) are not as free of friction, drag or stiction problems, as are the same films containing chromium dioxide (see FIG. 5).

Thus, the present invention resides in the synergistic effect achieved by a specific hard segment content polyester-polyurethane and chromium dioxide particles. This synergistic effect is believed to be caused by interaction between the urethane hard segments and the chromium dioxide particles.

With the use of the present invention, backcoating of a chromium dioxide tape media, to eliminate stiction, is no longer necessary.

Formulation procedures for making polyester-polyurethanes of any desired, and reasonably, hard segment content, including the critical range of from 37 to 40 percent by weight, and in accordance with the teachings of aforesaid U.S. Pat. No. 4,284,750 (incorporated herein by reference), is within the skill of the art, and will not be described herein.

Figure 6:
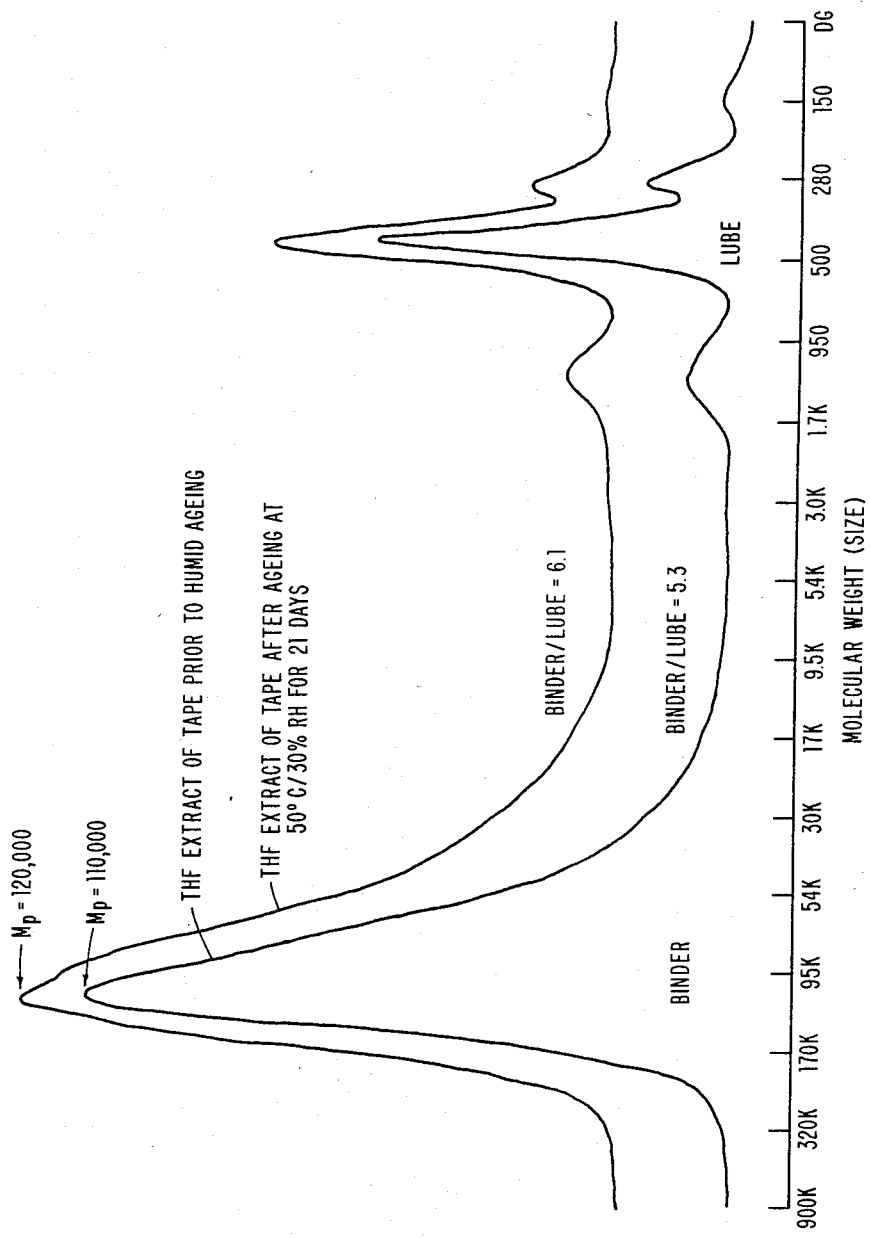
FIGS. 6 and 7 compare the alteration in binder molecular weight which occurs with a polyester-polyurethane binder when used with gamma iron oxide pigment, and when used with chromium dioxide pigment, respectively.
Figure 7:
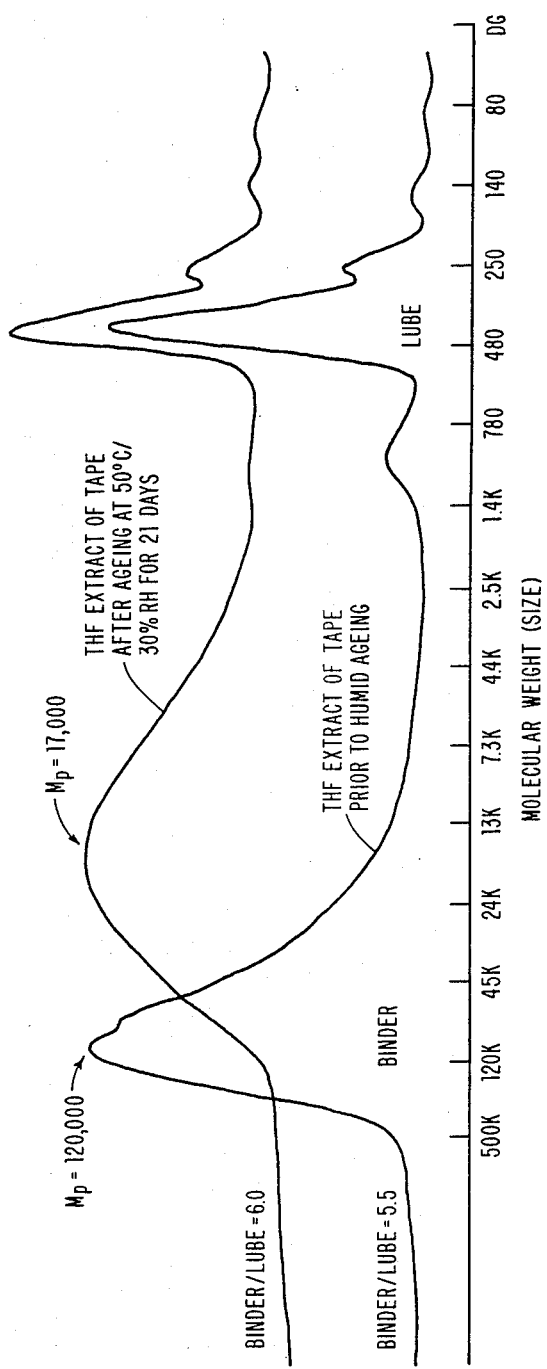

The polyurethane binder/chromium dioxide pigment media of the present invention must be chemically and mechanically stable over the range of temperatures potentially present in a tape user's environment. The inherent hydroscopic instability of chromium dioxide pigment makes the choice of a hydrolytically stable binder far more important than when gamma iron oxide particles are used with the same binder to make media. This is demonstrated in the examples presented in FIG. 6. Here the extractable binder recovered from a tape (by subjecting it to the THF solvent) constructed from a butanedioladipate polyester-polyurethane(pBDA) and $\gamma$-$Fe_2O_3$ is shown after exposure to humid aging. No significant alteration in the molecular weight of the polyurethane was observed for the gamma iron oxide media. Addition of $CrO_2$ to the same polyester-polyurethane formulation, in place of the $\gamma$-$Fe_2O_3$, produced a marked degradation of the polyurethane after humid aging as shown in FIG. 7.

It was found, furthermore, that continued exposure to humid aging (FIG. 8) produced increasingly severe polymer degradation of the $CrO_2$ media.

Reduction in the molecular weight of the binder material produces two undesirable effects; namely, (1) deterioration in the mechanical properties of the tape, and (2) increasingly severe contamination of the tape drive which uses the tape, leading to adhesion or stick of the tape to the recording head surface.

Figure 9:
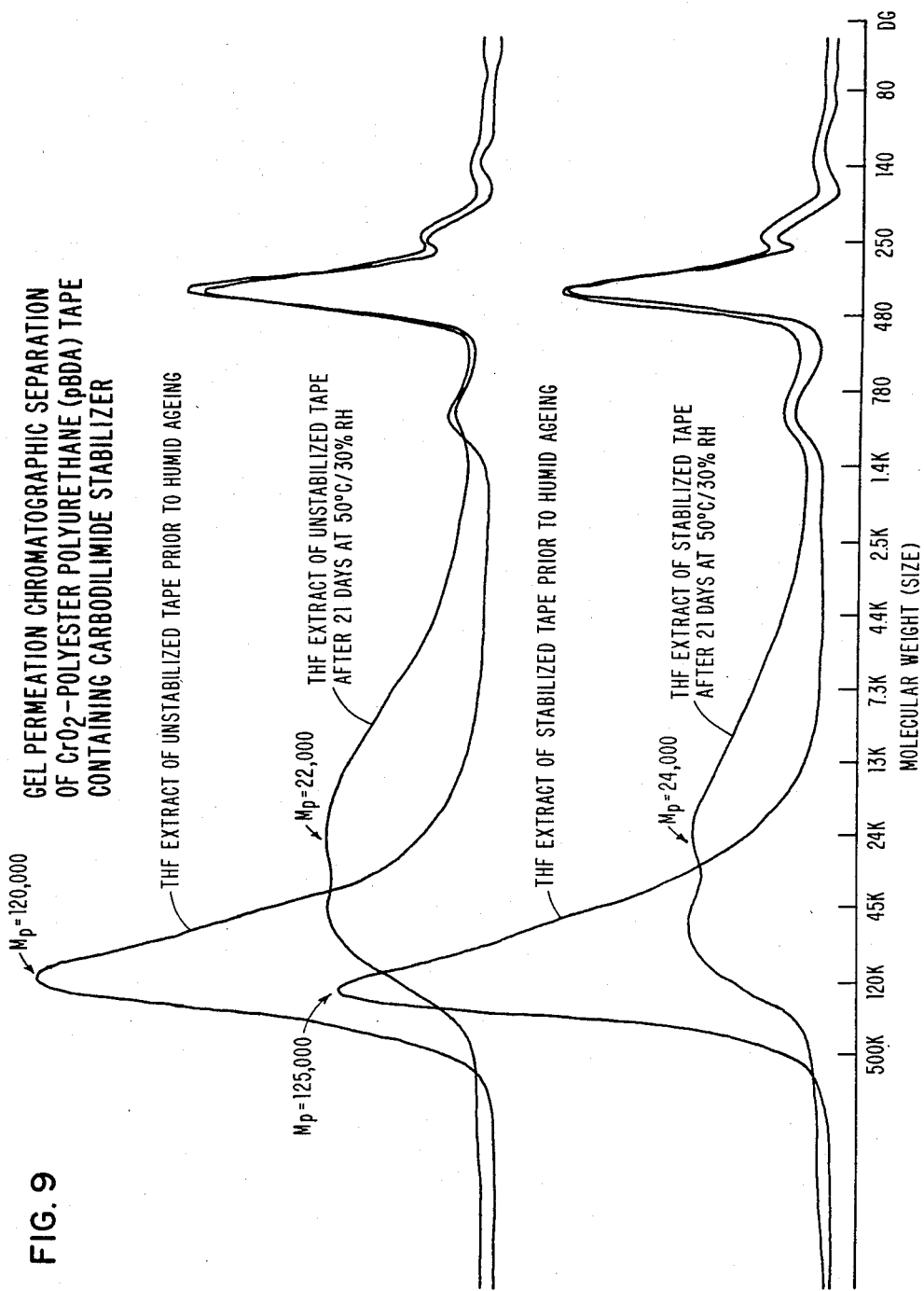
FIG. 9 shows that an attempt to use stabilizers, such as carbodiimide, to cure the problem shown by FIGS. 7 and 8, did not work.

It has been found that the addition of stabilizers, such as a carbodiimide, to this polyester-polyurethane, having $CrO_2$ pigment, produced no detectable improvement in resistance to degradation (FIG. 9).

Figure 10:
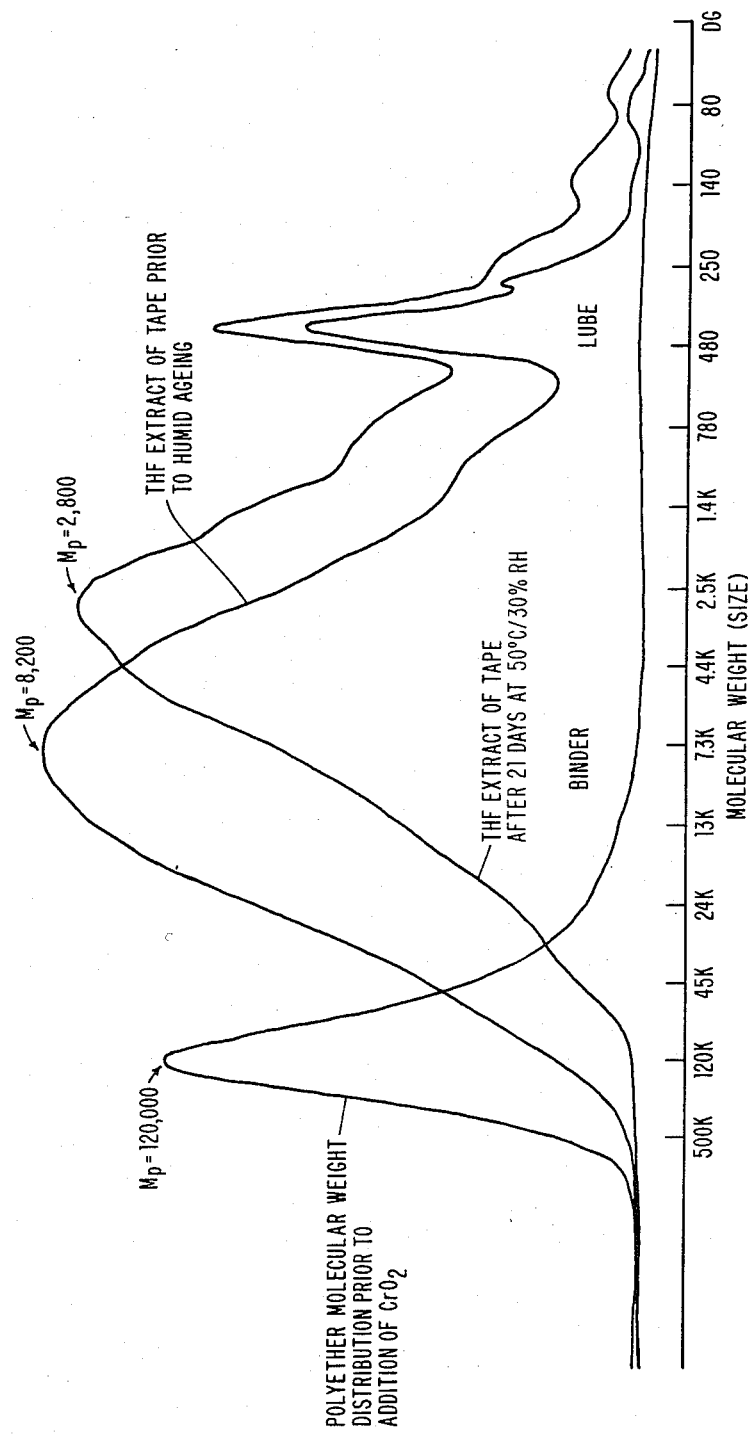
FIG. 10 shows that an attempt to use polyether-polyurethane binder, to cure the problem shown by FIGS. 7 and 8, did not work.

Another alternative, the use of a polyether-polyurethane resin, rather than a polyester, was also found to be inadequate, since oxidative degradation leads to even more severe deterioration of these resins in the presence of $CrO_2$ pigment (FIG. 10).

The use of a polyester-polyurethane of the present invention, constructed from 1,4-cyclohexanedimethanol adipate/azelate(pCHDA), is known to impart a significant resistance to hydrolytic degradation C. S. Schollenberger, *J. Elastoplastics*, Vol. 3, pp. 28–56 (1971)

and was found to substantially improve the resistance of a $CrO_2$ filled polyurethane to humid aging, as shown by the data presented in FIG. 11.

Figure 8:
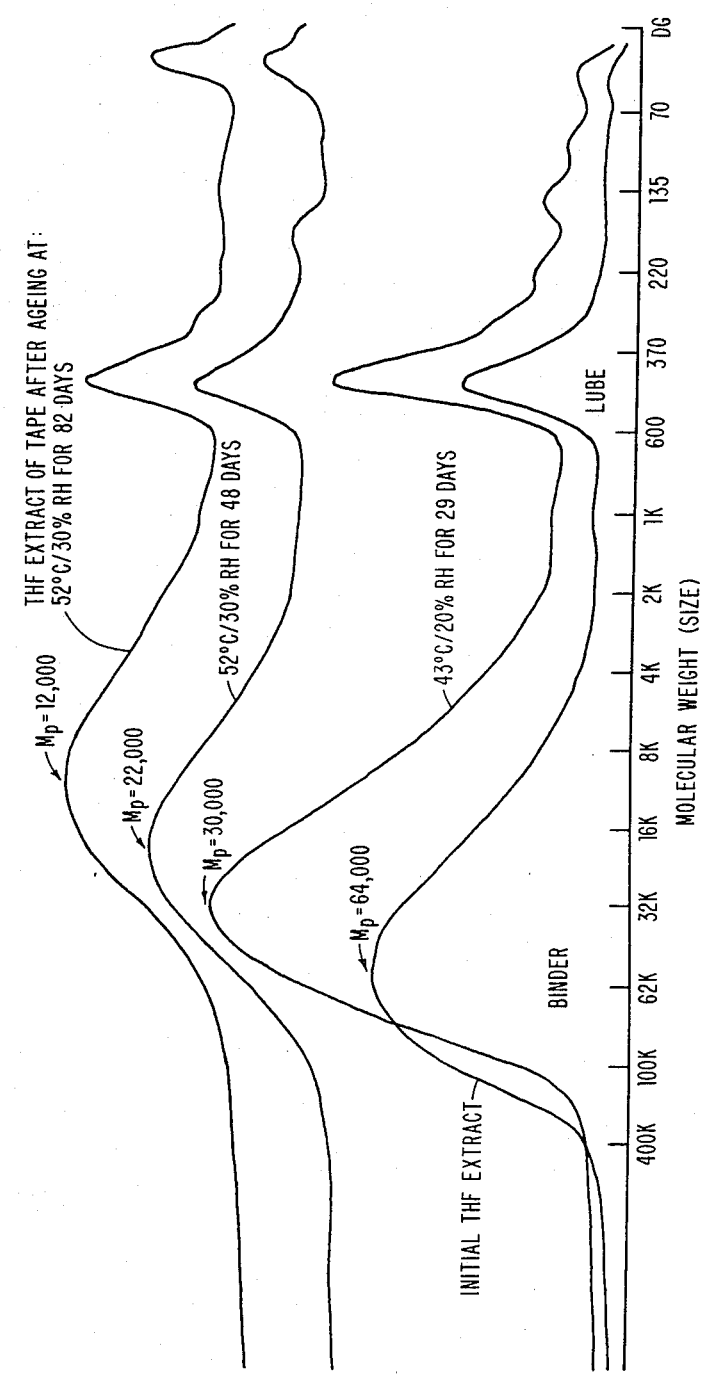
FIG. 8 is similar to FIG. 7, and shows that increased aging at higher relative humidity (FIG. 8) causes increased polymer degradation.

It should be noted that increased humidity (60% RH) was used to produce faster degradation of the polyester of FIG. 11 than was used to produce the corresponding data presented in FIG. 8, for the pBDA polyester-polyurethane. Even so, most of the observed decrease in the molecular weight of the extracted binder shown by FIG. 11 is attributable to reduced solubility of the resin in the extracting solvent (THF) with increased aging. This gives rise to the FIG. 11 observed fractionation of the binder, to give a lower molecular weight extract. Since the amount of extractable binder was found to increase for the less hydrolytically stable polyester-polyurethane (pBDA, FIG. 8), the comparison of data presented in FIGS. 8 and 11 must take into account the amounts of extractable material relative to the lubricant peak, as well as the observed decrease in molecular weight.

Various figures of the drawing reference the use of a polyester-polyurethane of the type defined by U.S. Pat. No. 4,284,750, but with the hard segment content being 32%; i.e., outside of the critical range of the present invention; namely, 37 to 40%.

This 32% example included a butanediol chain extender in the amount of 7.55 weight percent, and its polyester component was of a molecular weight in the range of 2,047 to 3,023. The polyester was composed of adipic and azelaic esters, 70% and 30% molar, respectively.

In contrast, the drawing's various 37 and 40% hard segment examples of the present invention, while also using butanediol and the adipic/azelaic esters, differed by having a polyester molecular weight of 1,504 and 1,024, respectively, and a butanediol content of 10.3 and 5.2 weight percent, respectively.

In all examples, the hard segment was constructed from 4,4-diphenylmethane diisocyanate (MDI), with the percent hard segment being calculated as the weight of MDI added to the polyol mixture, i.e., the polyester and butanediol.

All examples were made by preparing a slurry of the magnetic particle, a dispersant and a solvent; then preparing a binder solution of the polyester-polyurethane, a lubricant and a solvent; and adding the binder solution to the slurry to form the ink which was then coated onto a flexible substrate to form magnetic recording tape.

The slurry was prepared in a micro-attritor (or an equivalent mill), using 1400 grams of $\frac{1}{8}$ inch diameter steel balls. After high speed milling for from two to four hours, at about 12° C., the binder solution was added, and milling was continued for an additional two to four hours. The resulting coating ink had a viscosity of from 450 to 600 cps, as measured by a Brookfield meter operating at one rpm.

The 32% example slurry contained 101.5 grams (21.6 cc) of chromium dioxide pigment, 3.0 grams (2.9 cc) of lecithin dispersant (Yelkin TS brand), solvents in the amount of 93.8 grams (106 cc) THF and 31.3 grams (39.1 cc) MIBK. This example's binder solution contained 18.1 grams (15.1 cc) polyester-polyurethane, 2.1 grams (2.4 cc) of tridecyl stearate (TDS) lubricant (U.S. Pat. No. 4,303,738 teaches the use of this lubricant), and the solvents THF and MIBK, in the amounts of 98.1 grams (110.9 cc) and 32.7 grams (40.9 cc), respectively.

The 40% example slurry contained 105.5 grams (21.6 cc) chromium dioxide pigment, 3.0 grams (2.9 cc) of the lecithin dispersant, and 145 cc THF. This example's binder solution comprised 18.2 grams (15.1 cc) of the polyester-polyurethane, 2.1 grams (2.4 cc) of the TDS lubricant, and 134.3 grams (151.8 cc) of the THF solvent. If one were to use both the THF and the MIBK solvents in the slurry and the binder of the 40% example, the slurry would contain 93.8 grams THF and 31.3 grams MIBK; while the binder solution would contain 98.1 grams THF and 32.7 grams MIBK.

While the invention has been particularly shown and described with reference to preferred embodiments thereof, it will be understood by those skilled in the art that various changes in form and details may be made therein without departing from the spirit and scope of the invention.

What is claimed is:

1. A flexible magnetic recording media, comprising; a flexible substrate, and a ferromagnetic chromium dioxide pigment-loaded-binder adhesively coating said substrate; the improvement comprising said binder being a thermoplastic polyurethane formed as a reaction product of:
  (A) a hydroxyl-terminated polyester which itself is a reaction product of a difunctional alcohol (diol) having hydrolytic stability, and a dicarboxylic acid selected from the group consisting of adipic acid, azelaic acid and 1,12-dodecanedioic acid, or mixtures thereof, said polyester having a hydroxyl number of about 50 to 250;
  (B) a chain extender comprising a primary or a secondary alcohol selected from the group consisting of 1,4-butanediol, 1,3-butanediol, 1,5-pentanediol, 1,6-hexanediol and 2,5-hexanediol, the resultant hydroxyl number of said polyester and chain extender being about 130 to 300; and
  (C) an aromatic diisocyanate;
wherein the relative proportions of (A), (B) and (C) are selected to produce a pigment-loaded polyurethane having a hard segment content in the range of about 37 to 40 percent by weight, and a soft segment molecular weight ($M_n$) in the range of about 500 to 1500, wherein the pigment loading is in the range 80 to 88% by weight.

2. The magnetic recording media of claim 1 wherein said difunctional alcohol is 1,4-cyclohexanedimethanol.

3. The magnetic recording media of claim 2 wherein the chain extender is 1,4-butanediol.

4. The magnetic recording media of claim 1 wherein the difunctional alcohol is 1,4-cyclohexanedimethanol, the chain extender is 1,4-butanediol, the hard segment content is about 39 percent by weight, and the soft segment molecular weight is about 1500.

5. The magnetic recording media of claim 1 wherein the molecular weight of said polyurethane is above 60,000.

6. The magnetic recording media of claim 1 wherein said aromatic diisocyanate is 4,4-methylenebis(1,4-phenylene) diisocyanate (MDI).

7. The magnetic recording media of claim 2 wherein said aromatic diisocyanate is 4,4-methylenebis(1,4-phenylene) diisocyanate (MDI).

8. The magnetic recording media of claim 3 wherein said aromatic diisocyanate is 4,4-methylenebis(1,4-phenylene) diisocyanate (MDI).

9. The magnetic recording media of claim 4 wherein said aromatic diisocyanate is 4,4-methylenebis(1,4-phenylene) diisocyanate (MDI).

10. The magnetic recording media of claim 5 wherein said aromatic diisocyanate is 4,4-methylenebis(1,4-phenylene) diisocyanate (MDI).

* * * * *